Figure 1:
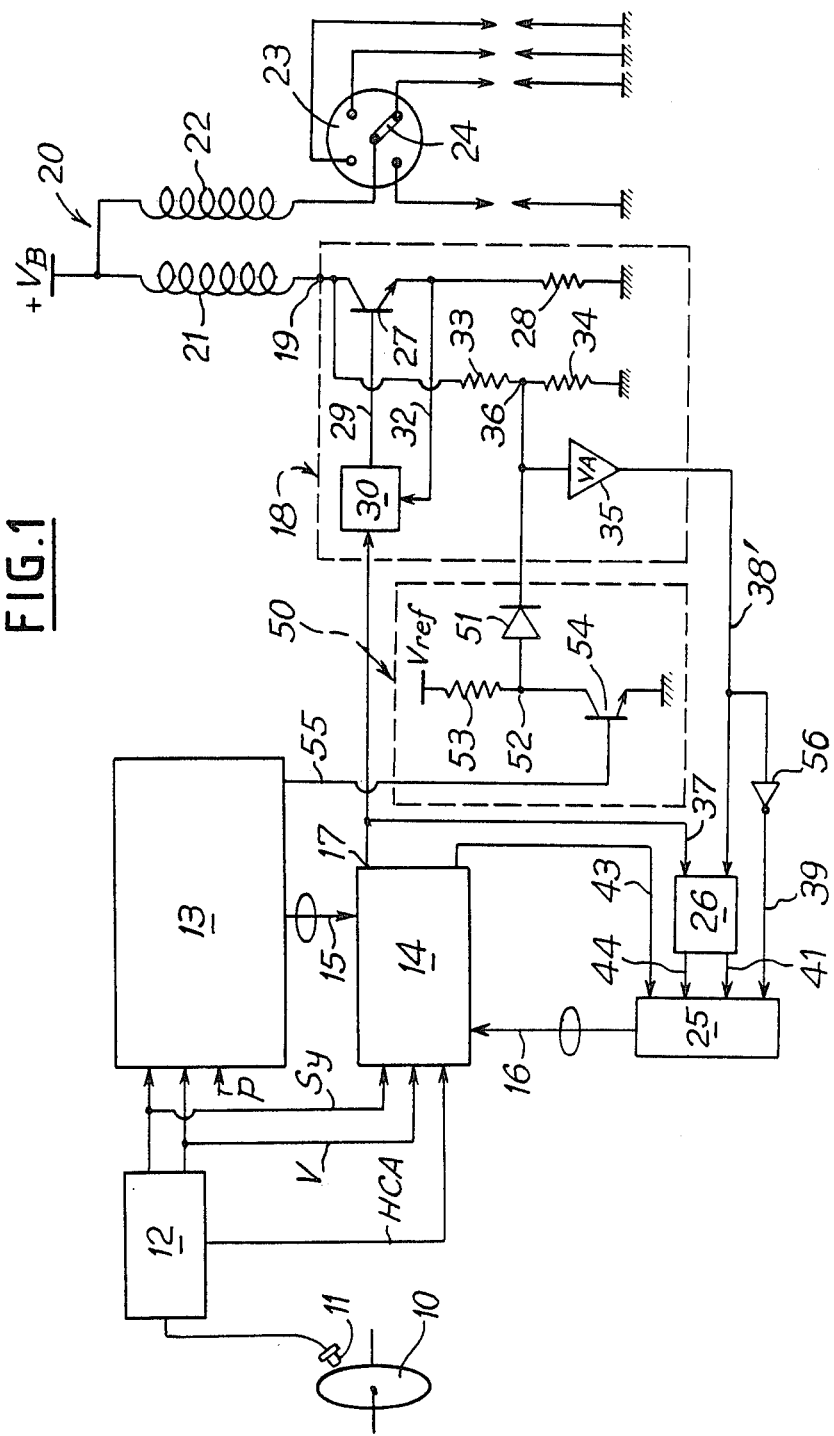

United States Patent [19]

Venieres et al.

[11] Patent Number: 4,776,311
[45] Date of Patent: Oct. 11, 1988

[54] PROCESS AND DEVICE FOR LIMITING THE RUNNING SPEED OF AN INTERNAL COMBUSTION ENGINE WITH ELECTRONIC IGNITION

[75] Inventors: Francois Venieres; Pierre Luna, both of Toulouse, France

[73] Assignee: Bendix Electronics S.A., Toulouse, France

[21] Appl. No.: 70,670

[22] Filed: Jul. 1, 1987

Related U.S. Application Data

[63] Continuation of Ser. No. 850,994, Apr. 11, 1986, abandoned.

[30] Foreign Application Priority Data

Apr. 19, 1985 [FR] France ............................ 85 05973

[51] Int. Cl.$^4$ .................................................. F02D 5/04
[52] U.S. Cl. ........................................ 123/335; 123/644
[58] Field of Search ........................................ 123/335, 644

[56] References Cited

U.S. PATENT DOCUMENTS

| | | | |
|---|---|---|---|
| 3,563,219 | 2/1971 | Mieras | 123/335 |
| 3,884,203 | 5/1975 | Cliffgard | 123/335 |
| 3,993,031 | 11/1976 | Schmaldienst | 123/335 |
| 4,171,687 | 10/1979 | Coventry | 123/335 |
| 4,402,299 | 9/1983 | Nakao | 123/644 |
| 4,452,199 | 6/1984 | Andreasson | 123/335 |
| 4,570,595 | 2/1986 | Andreasson | 123/335 |
| 4,572,150 | 2/1986 | Foster | 123/335 |
| 4,595,978 | 6/1986 | Kanno | 123/335 |

FOREIGN PATENT DOCUMENTS

| | | | |
|---|---|---|---|
| 2056130 | 4/1971 | France | 123/335 |
| 2343128 | 3/1977 | France | 123/335 |
| 2904108 | 3/1979 | Fed. Rep. of Germany | 123/335 |
| 3413089 | 10/1984 | Fed. Rep. of Germany | 123/335 |
| 3319025 | 11/1984 | Fed. Rep. of Germany | 123/335 |
| 58-133474 | 9/1983 | Japan | 123/335 |

Primary Examiner—Raymond A. Nelli
Attorney, Agent, or Firm—Russel C. Wells; Markell Seitzman

[57] ABSTRACT

The present device for limiting the running speed is associated with an electronic ignition device comprising at least one energy storage member (21) which is normally charged so as to store at least a nominal quantity of energy, means (22, 23) for applying the said energy to an ignition coponent and electronic means (14, 25, 26) for generating the charging time of the energy storage member. The device itself for limiting the running speed comprises means (10, 13) for detecting the maximum permitted running speed of the engine and an electronic circuit (50) which is put, by the detecting means, into a first inactive state when the engine running speed is less than the maximum running speed and into a second active state in which it controls the generation by the said means (14, 25, 26) of a charging time of angle of the energy storage member at a non-zero value which is significantly less than the time or angle which is necessary for the production of the said nominal quantity of energy when the engine running speed is equal or above the maximum permitted running speed.

4 Claims, 2 Drawing Sheets

PROCESS AND DEVICE FOR LIMITING THE RUNNING SPEED OF AN INTERNAL COMBUSTION ENGINE WITH ELECTRONIC IGNITION

This application is a continuation of application Ser. No. 850,994 filed Apr. 11, 1986, now abandoned.

The present invention concerns a process and device for limiting the running speed of an internal combustion engine with electronic ignition.

Means are already known from the prior art for protecting an internal combustion engine against overspeeding by acting in the region of the ignition when the maximum permitted running speed of the engine is reached.

A first solution consists in completely suppressing the electric arc at the terminals of the spark plugs when the engine reaches its maximum running speed by inhibiting the ignition control. An undesirable consequence of this method, among others, is that unburnt fuel passes into the exhaust system and jolts which are unpleasant for the driver occur each time the ignition is cut off and reinstated.

In German patent application DOS No. 3.303.675 the electrical arc is suppressed by the progressive reduction of the energy actually stored in the primary winding of the ignition coil. Such reduction occurs from a maximum value to a zero level within a range of the engine speed of about 50 rpm in width above the maximum authorized speed. Such proposal does not clearly eliminate the above mentioned drawback since the electrical arc is eventually suppressed.

British Pat. No. GB.A.1,513,796 attempts to overcome these disadvantages by means of a device which provides a reduction of the angle of advance of the ignition, when the engine exceeds its maximum running speed. However, the device is not actually-satisfactory because it causes a reduction of the torque of the engine which is insufficient to limit its running speed with a poor response time. In fact, this running speed continues to increase progressively before diminishing, which results either in a risk of damage to the engine if the running speed, at which the reduction of advance intervenes, is close to the maximum running speed, or in a reduction in the quality of the performance of the engine if this running speed at which intervention occurs is less than the maximum running speed.

The invention aims to provide a process for limiting the running speed of an internal combustion engine which enables very rapid limitation to be obtained of the running speed of an engine at its maximum value while avoiding the disadvantages of the aforementioned prior solutions.

An object of the invention is therefore a process for limiting the running speed of an internal combustion engine with an electronic ignition device comprising at least one energy storage member which is normally charged electrically so as to store at least a nominal quantity of energy and means for applying the energy to at least one ignition component which is associated with a cylinder of the engine, said process comprising the step to generate, in response to the detection of the maximum permitted running speed of the engine, a time or charging angle of the energy storage member at a non-zero value which is significantly less than the time or angle which is necessary to produce the nominal quantity of energy. It is assumed that the nominal quantity of energy of the coil (or the capacitor) corresponds to the maximum energy sufficient to create an electric arc at the terminals of the spark plugs and to maintain the same for a sufficient duration to obtain a complete combustion of the air-fuel mixture during the normal operation of the engine.

In one embodiment of the invention, the process further comprises the step to reduce the ignition advance of the engine when its running speed is substantially equal to the maximum permitted value. Thanks to the combined reductions of ignition advance and of the charging angle of the coil, the torque of the engine is then rapidly decreased.

It is also an object of the invention to provide a device for putting into operation the process defined above, associated with an electronic ignition device which comprises electronic means for generating the charging time of the energy storage member, further comprising means for detecting the maximum permitted running speed of the engine and an electronic circuit which is put, by the detecting means, into a first inactive state when the engine running speed is less than the maximum running speed and into a second active state in which it controls the generation of the said lesser time or charging angle by the said generating means when the engine running speed is equal or above the maximum permitted running speed.

Figure 2:
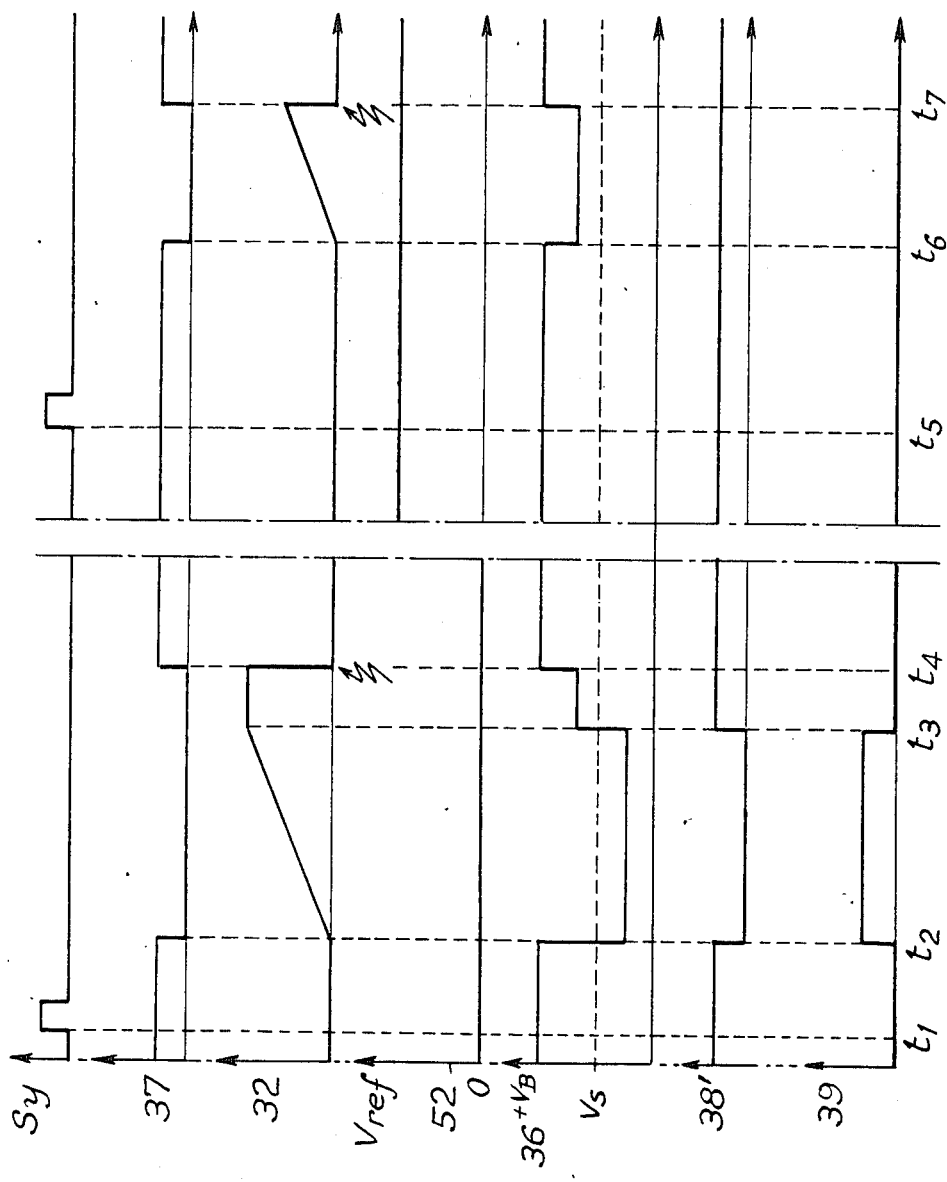

The invention will now be described by way of example with reference to the accompanying drawing in which:

FIG. 1 is an electrical diagram of a device for limiting engine running speed which is associated with an electronic device for controlling inductive ignition, and FIG. 2 is a timing diagram showing signals which appear at different points of the diagram shown in FIG. 1.

In FIG. 1 a calculator for the ignition advance 13 receives a synchronizing signal $S_y$ at a first input, and receives a speed signal V at a second input, signals which are obtained from a stage 12 for processing the signal derived from a position sensor 11 which detects the passage of teeth with which the periphery of a disc 10 is provided, the disc 10 being fixed to the crank shaft of the engine and rotating in synchronism with it. The sensor 11 gives a permanent electrical image of the periphery of the disc 10. The calculator 13 also receives a pressure signal P at a third input, which is derived from a sensor (not shown) which provides an image of the air pressure at the inlet to the engine. The calculator 13 calculates, as a function of the speed and of the pressure at the inlet to the engine, a raw value of ignition advance angle which is applied by its outputs 15, in the form of a binary number expressed as a number of teeth of the disc 10 and as a number of subdivisions between two teeth, to the corresponding inputs of a block 14 for generating the signal for controlling an ignition coil.

The block 14 also receives at its inputs 16 a second binary number representing the angle during which the coil is conducting, expressed as a number of teeth of the disc 10. These two binary numbers are processed by the block 14 by means of three types of signals derived from the block 12 for processing the sensor signal: the synchronizing signal $S_y$, the speed signal V and a signal HCA.

The block 14 for generating the signal for controlling the coil provides at its output 17 a low power signal which is transmitted to a power stage 18 whose output 19 is connected to the ignition coil 20 having a primary winding 21 and a secondary winding 22 which is connected at one end to the central portion of a distributor 23 around which a moveable arm 24 rotates which, during its rotation, puts into contact successively the secondary winding 22 of the ignition coil 20 with the spark plugs of the different cylinders of the engine so as to cause the explosion and the combustion of the mixture contained in the cylinders.

The device so far described is identical to that which is the object of U.S. Pat. No. 4,367,710 issued to Deleris on Jan. 11, 1983, and entitled "Spark Coil Control Device for Internal Combustion Engine Equipped with Electronic Ignition Advance", except that the binary number representing the angle at which the coil is conducting which is applied to the inputs 16 of the block 14 is not prepared by the calculator 13 but by circuits 25 and 26 which are clarified below. Reference should therefore be made to said U.S. patent concerning the detailed description of the operation of the aforesaid device.

The circuits 25 and 26 themselves correspond essentially to the device described in U.S. Pat. No. 4,469,081 issued to Mate on Sept. 4, 1984, and entitled "Ignition Coil Control Device for Regulating the Optional Conductive Time for an Internal Combustion Engine", and assigned to a common assignee and incorporated herein by reference and illustrated particularly in FIG. 4 in the patent. Thus, in the U.S. Pat. No. 4,469,081, the output stage of the ignition calculator 2 of the given reference, corresponds to blocks 14 and 18 of the present application, the circuit 36 in U.S. Pat. No. 4,469,081 corresponds with a modification to the circuit 26 herein and the rest of the circuit shown in FIG. 4 is represented herein by the circuit 25. Inputs 39, 41, 43 and 44 of the circuit 25 receive the same signals as those carried by the conductors which are given the same references in U.S. Pat. No. 4,469,081 and the outputs 16 of the circuit 25 correspond to the outputs 31 of the memory 29 in the U.S. Pat. No. 4,469,081.

The circuits 26 of the present application and 36 of the U.S. Pat. No. 4,469,081 receive at 37 the same signal for controlling the conducting time of the ignition coil but the signal applied via 38′ to the circuit 26 herein is different from the signal 38 which is applied to the circuit 36 (U.S. Pat. No. 4,469,081). The signal 38′ generated by the power stage 18 is the inverse of the signal of line 1′4 shown in FIG. 5 carried by the conductor 39 shown in FIG. 4 of U.S. Pat. No. 4,469,081. The signal present at 38′ is thus inverted at 56 so as to give at 39 the same signal 1′4 as in the aforementioned U.S. Pat. No. 4,469,081.

The circuits 26 of the present application and 36 of U.S. Pat. No. 4,469,081 both comprises elementary combinations of bistables and monostables which only differ in construction details from the scope of a person versed in the art. These modifications are perfectly obvious as regards the operation of circuits 25 and 26 of the present application and of the device described in U.S. Pat. No. 4,469,081 so that reference should be made to the latter for a detailed description of the operation.

The power stage 18 comprises a switching power transistor 27 whose collector is connected to the battery voltage $+V_b$ through the intermediary of the primary winding 21 of the coil 20 and whose emitter is connected to ground through the intermediary of a resistance 28 for measuring the current in the winding 21 of the coil. The base of the transistor 27 is connected via 29 to a stage 30 for controlling the transistor and for limiting the current in the primary of the coil 20. This stage 30 is connected to the output 17 of the block 14 which applies to it the signal for controlling the conducting time of the coil, and to the emitter of the transistor 27 via a conductor 32 which delivers an image signal of the current in the primary 21 of the coil 20.

The collector of the transistor 27 is connected to ground through the intermediary of a dividing bridge consisting of two resistances in series 33 and 34. The common point 36 of these two resistances is connected to the input of a comparator 35 in which the voltage existing at 36 is compared with a threshold voltage $V_s$ and the output of the comparator 35 is connected to the input of the circuit 26 via the conductor 38′.

The power stage assembly 18 together with the components which constitute are conventional and it is not necessary to give a more detailed description.

The device for limiting running speed 50 which is associated with the ignition control device described above comprises a signal diode 51 whose cathode is connected to the input of a comparator 35 and whose anode is connected at 52 to a reference voltage $V_{ref}$ through the intermediary of a resistance 53 and to ground through the intermediary of the collector-emitter junction of a transistor 54. The base of the transistor 54 is driven at 55 by an output of the calculator 13 which is programmed so shut off the transistor 54 when the running speed of the engine is greater than or is equal to the maximum permitted running speed and to render it conducting in the opposite case.

The operation of the device described above is explained as follows with reference also to the timing diagram shown in FIG. 2 in which the different signals are identified by the numerical references of the conductors which carry them.

The stage 12 generates at each top dead centre of a piston, or at a predetermined angular position relative to the top dead centre, the signal $S_y$ which appears at the instant $t_1$. At the instant $t_2$, calculated by the block 14 as a function of the optimum conducting time of the coil which is determined by the circuits 25, 26 as described in U.S. Pat. Nos. 4,367,710 and 4,469,081, the block 14 generates at 17 the signal 37 which, applied to the stage 30, renders the transistor 27 conducting and allows current to flow in the primary 21 of the coil 20. The signal 32, which is an image of the current in the primary of the coil, increases until the instant $t_3$ at which instant, the nominal current (corresponding to the nominal energy of the coil) having been reached, the stage 30 starts to regulate the transistor 27. The current in the coil is then maintained at its nominal value until the instant $t_4$ at which the signal 37 goes high once again and the transistor 27 is shut off by the stage 30 and a spark appears at the terminals of the spark plug which is selected by the moveable arm 24.

During this phase of operation between the instants $t_1$ and $t_4$, the running speed of the engine is assumed to be less than its maximum permitted value so that the calculator 13 sends at 55 a signal which renders the transistor 54 conducting. The point 52 is then effectively at ground potential and the diode 51 is reverse biased. At the instant $t_2$ when the coil starts to conduct, the voltage at 36 falls below the threshold voltage $V_s$ of the comparator 35 whose output 38′ changes from a high to a low level.

The signal 38′ remains low until the instant $t_3$ at which, as the current in the primary of the coil 20 is now limited, the voltage at 36 rises above the threshold $V_s$ of the comparator 35 whose output 38' goes high once again. The period $t_2$–$t_3$ of the signal 38' thus represents the conducting time $t_c$ measured, which is precisely that which is necessary for the production of the nominal quantity of energy at the terminals of the coil which is used by the circuits 25 and 26 to calculate and to generate an optimum conducting time for the next ignition cycle as described in U.S. Pat. No. 4,469,081.

FIG. 2 also shows a second ignition and conducting cycle which occurs in a situation where the engine is exceeding its maximum permitted running speed. The signal applied at 55 by the calculator 13 has then shut off the transistor 54 and the point 52 is at the voltage $V_{ref}$.

The signal $S_y$ appears at the instant $t_5$, then at the instant $t_6$ the transistor 27 is rendered conducting and the voltage at 36 falls. The voltage $V_{ref}$ is chosen in such a way as to be greater than the voltage at 36 when the primary of the coil 20 is conducting so that the diode 51 is biased in the forward direction. The reference voltage $V_{ref}$, which is greater than the threshold voltage $V_s$, is applied at the input of the comparator 35 whose output 38' consequently remains high.

Under these conditions, the circuits 25–26 interpret the signal 38' as corresponding to an absence of the conducting time signal and will generate for the next ignition cycle a substitute conducting time as described in U.S. Pat. No. 4,469,081. Such substitute conducting time which could be variable is determined to remain at a non-zero reduced value less than the time which is necessary to produce the said nominal quantity of energy. For instance in one embodiment of the invention the calculator 14 generate for an engine speed higher than 6000 rpm a fixed charging angle of about 20 degrees. As a result a lower energy spark will be generated which will contribute to reduce the torque of the engine and to reduce its running speed.

At the instant $t_7$ of the current cycle, the signal 37 goes high once again and a spark is generated between the electrodes of one of the spark plugs. In the example shown in FIG. 2, the nominal current in the coil has not been reached in the instant $t_7$ and the period $t_6$–$t_7$ corresponds to the substitute conducting time of the coil, such time being maintained at its reduced value. This assumes that the maximum running speed of the engine has already been reached at the previous ignition cycle and that consequently the circuits 25–26 have already detected in 38' the absence of the conducting time signal.

If such were not the case, the signal 32 would have the same shape as that during the period $t_3$–$t_4$, with a regulation plateau, and the first substitute conducting time would be generated at the next cycle.

The conducting time of the coil thereafter remains held at its reduced value as long as the running speed of the engine remains greater than the maximum permitted running speed, this reduction of the energy of the generated electric arc being able to be combined simultaneously with a reduction of the ignition advance angle. In such a case the calculator 13 generates a signal corresponding to a reduced ignition advance when the maximum authorized speed is sensed. In another embodiment of the invention the reduced ignition advance signal is generated for a speed level slightly below the maximum permitted speed of the engine.

Anyhow, the reduction in energy of the spark according to the invention proves to be more effective than the sole reduction of the ignition advance angle in order to limit very rapidly the running speed of the engine as soon as it reaches its maximum value.

The device for limiting running speed according to the invention is of a construction which is particularly simple and of low cost when it is combined with an electronic ignition device which already comprises the possibility of detecting the engine running speed and of controlling the conducting time or angle of the coil. However, the invention is not limited to the embodiment described, not only as regards the device for limiting running speed itself but also as regards the ignition device with which it is associated which could be, for example, of a capacitive type and not an inductive type.

We claim:

1. A device for limiting the running speed of an internal combustion engine comprising:
   an electronic ignition system having an energy storage member with a primary and a secondary winding and at least one ignition component;
   mans for measuring the current in said primary winding;
   means for detecting the running speed of the engine, said means having a first state when the engine running speed is less than the maximum permitted running speed and a second state when the engine running speed is greater than the maximum permitted running speed;
   comparing means for comparing a voltage which is an image of the current in said primary winding with a threshold voltage and said comparing means having a first logic output state when said voltage image is greater than said threshold voltage and a second opposite logic output state;
   inhibiting means responding to said second state of said detecting means for forcing said output state of said comparing means into said first logic output state;
   generating means responding to said first state of said detecting means for generating a first charging time for storing a nominal quantity of energy in said energy storage member and responding to said second state for generating a second charging time substantially less than said first charging time for storing a reduced quantity of energy in said energy storage member, said reduced quantity of energy being sufficient to energize said ignition component;
   means for applying said stored energy to said at least one ignition component; and
   means for maintaining said second charging time during said second state.

2. A device according to claim 1, wherein said comparing means has its comparing input connected to a dividing bridge which delivers said voltage image and wherein said inhibiting means comprise a diode whose cathode is connected to said comparing input of said comparing means and whose anode is connected to a reference voltage through a resistance and to ground through a collector-emitter junction of a transistor whose base is controlled by said detecting means so as to render said inhibiting means conducting when the engine running speed is less than the maximum permitted running speed and to render said inhibiting means non-conducting in the opposite case.

3. A process for limiting the running speed of an internal combustion engine with an electronic ignition device comprising at least one energy storage member which is normally charged electrically so as to store at least a nominal quantity of energy and means for applying the said energy to at least one ignition component which is associated with a cylinder of the engine, said process comprising the steps of:

detecting when the internal combustion engine has reached the maximum permitted running speed;

generating in response to said detection of the maximum permitted running speed of the engine, a reduced time for charging the energy storage member, said reduced time being sufficient to trigger the operation of the ignition component but significantly less than the time which is necessary to produce the nominal quantity of energy; and then maintaining said reduced charging time as long as a speed in excess of said maximum speed is detected.

4. The process according to claim 3 wherein the step for generating a reduced time advances the ignition advance of the engine when its running speed is substantially equal to the maximum permitted running speed.

* * * * *